Oct. 20, 1970 J. ARNAZ 3,534,487
APPARATUS FOR DIGGING AND CONTAINERIZING SMALL TREES AND SHRUBS
Filed Jan. 10, 1968 2 Sheets-Sheet 1
FIG_1
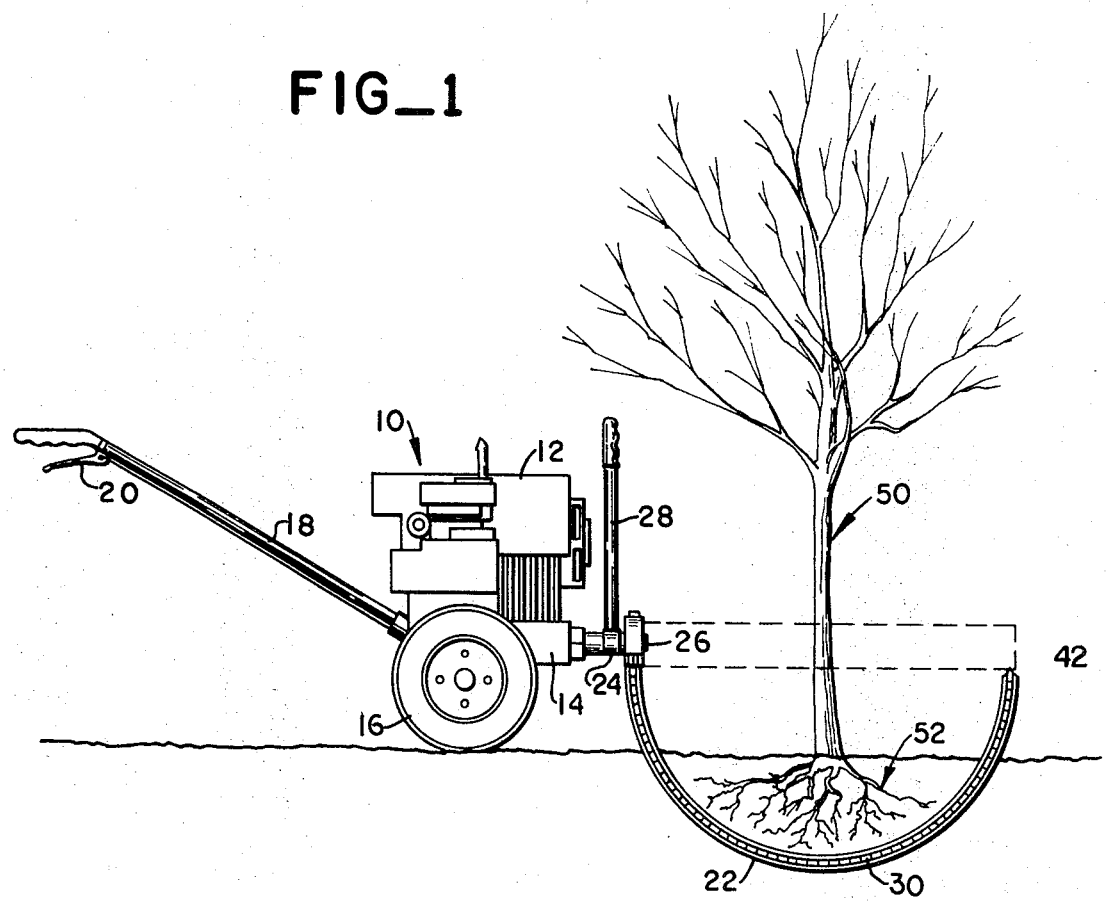
FIG_2
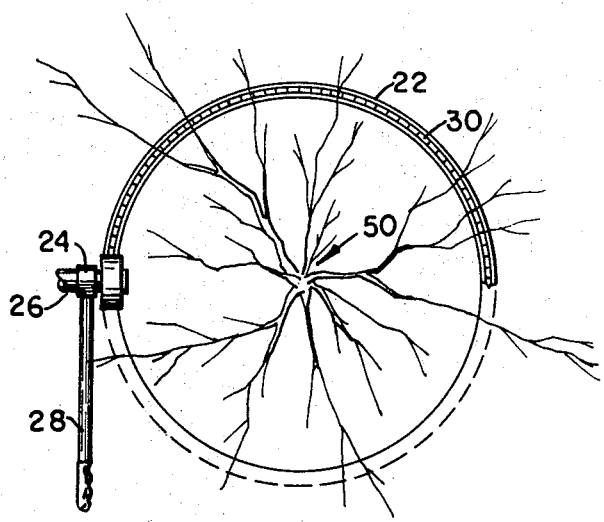
INVENTOR.
JOSEPH ARNAZ
BY
Townsend and Townsend
ATTORNEYS

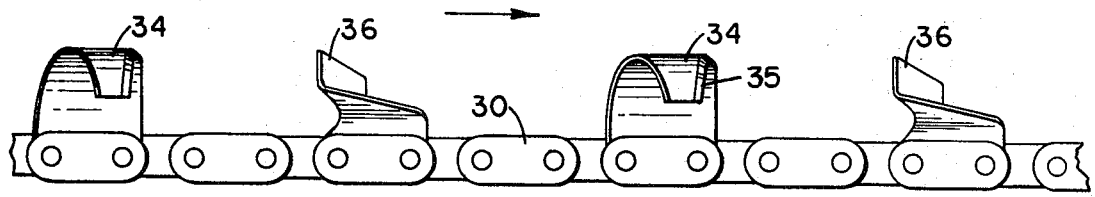
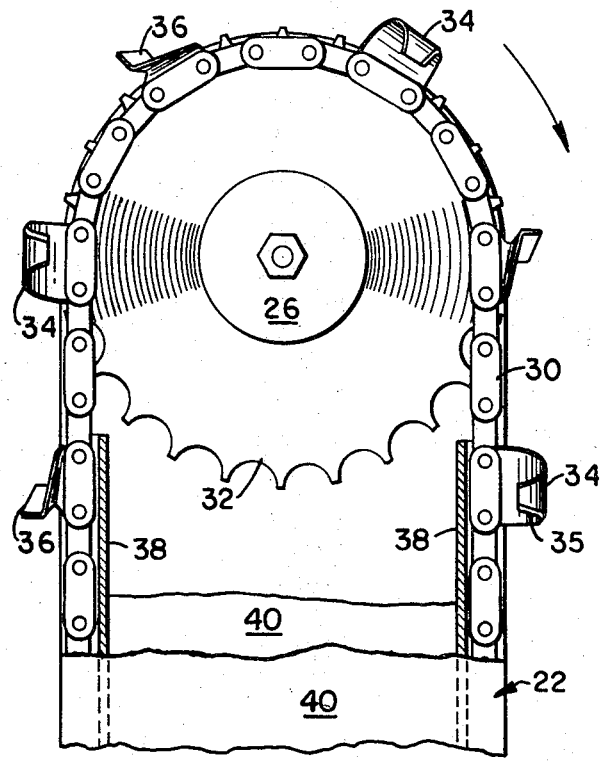
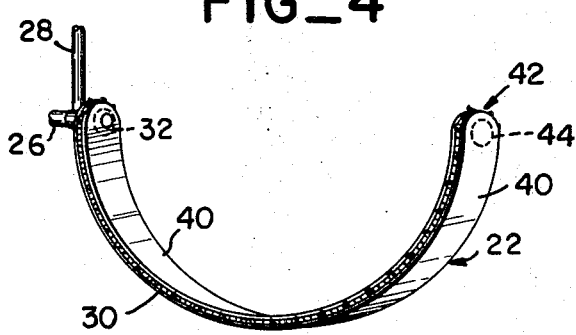
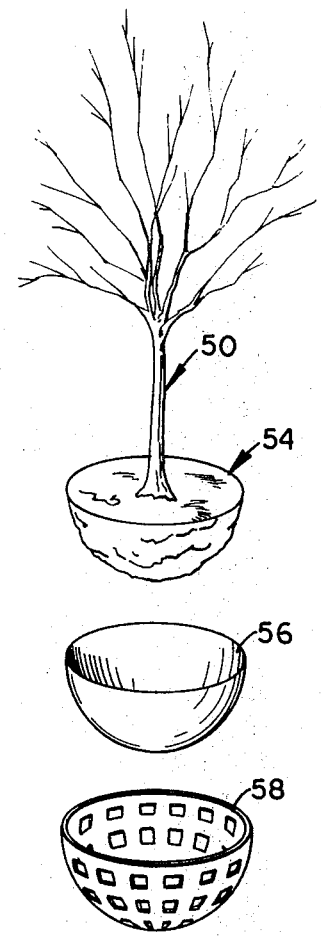

United States Patent Office 3,534,487
Patented Oct. 20, 1970

3,534,487
APPARATUS FOR DIGGING AND CONTAINERIZING SMALL TREES AND SHRUBS
Joseph Arnaz, P.O. Box 4177, Mountain
View, Calif. 94040
Filed Jan. 10, 1968, Ser. No. 696,773
Int. Cl. A01b *13/00*
U.S. Cl. 37—2
3 Claims

ABSTRACT OF THE DISCLOSURE

Apparatus for removing small trees and shrubs from the ground for transplantation in which an arcuate flat cutting unit is pivotally mounted on a power source and is provided with a handle for rotating the cutting unit so that it passes under a tree, severing the roots together with a bowl-shaped ball of earth. A method for transplantation of small trees and shrubs in which a bowl-shaped ball of earth containing the tree and its roots is placed in a fiber container and then in a foraminous container each having the same shape.

---

This invention relates to devices for removing small trees and shrubs from the ground for replanting and, more particularly, to a method and apparatus for digging and containerizing such small trees and shrubs for transplantation.

In the nursery industry, and particularly in the wholesale landscaping industry, a number of devices is available for removing large size trees from the earth, and enclosing or "balling" the earth surrounding the roots of such trees so that the tree is more likely to survive transportation and transplantation. A machine for the excavation and transplantation of large size trees is shown in U.S. Pat. No. 3,017,707.

In contrast to the situation with respect to large size trees, there has been, to my knowledge, no effective mechanical method of digging and balling small trees and shrubs for large volume landscaping requirements. A machine suitable for the removal of small trees and shrubs from the earth with their roots substantially dirt-free is shown in U.S. Pat. No. 2,835,992. The difficulty with an apparatus such as this, however, is the extreme shock suffered by the plant upon being excavated so that a large number of such trees and shrubs fail to survive upon transplantation.

Because of the difficulties associated with mechanical tree digging apparatus, it has been the practice to dig and ball small trees and shrubs by hand. Some nurseries, in order to avoid the problems associated with digging and balling trees and shrubs, grow certain species in containers. There are many problems associated with this practice, particularly with that of the plants becoming root-bound. This leads to rejection of proffered plants by purchasers of large quantities. For example, the State of California, one of the largest purchasers of landscaping trees and shrubs, often rejects 40% to 60% of the plants grown in their own containers.

When trees are grown in the ground, the nurseries use burlap within which to wrap the root system and its surrounding dirt, others use wooden boxes or metal cans. Burlap wrapping is particularly unattractive and, if the balled tree is stored for any length of time, the burlap tends to rot away thus spilling the dirt and making further storage and transportation of the wrapped tree difficult. Wooden boxes for storing dug trees are used for the larger size trees. Such boxes are often surrounded by metal straps in order to increase the strength of the box. Such boxes are costly and have the further disadvantage of being heavy and of tending to cause the trees to become root-bound if stored for any length of time.

Still other machines have been designed to remove small trees from the ground by cutting a cylindrical column of earth around the tree or by forcing spadelike devices in the shape of a square into the earth alongside the tree. Such devices have the disadvantage of not severing the roots under the tree, causing them to rip and break as the tree is lifted with the surrounding dirt. Further, such methods have the added disadvantage of requiring burlap wrapping or boxing as described above.

The present invention is designed to overcome the difficulties associated with prior art devices, to provide a system and apparatus for quickly and easily removing small trees and shrubs from the earth together with the dirt surrounding the root system thereof and containing the dirt and root ball in a novel container suitable for transportation, storage, and transplantation.

The apparatus of the present invention includes a power source, and a root and soil cutting unit of semicircular shape. The cutter unit carries a form of chain saw with appropriate teeth for cutting and scraping the dirt around and under a growing tree or shrub and, in addition, teeth for cutting the roots of the tree which may extend through the cutting circle of the cutter unit. A simple form of apparatus encompasses a prime mover or power source for moving the cutting chain, and a means for swinging the cutter unit through an approximately 180° arc from one side of a tree to the opposite side. The action of the cutter unit resembles that of the blade of a conventional ice cream scoop, moving from one side of the tree to the other and cutting out a saucer-shaped ball of dirt having the shape of a truncated hemisphere.

The system of the present invention envisions removing the tree from the earth with its partially hemispheric ball of dirt, placing the ball of dirt in an asphalt impregnated cellulose fiber container of the same shape and supporting the tree ball and celluose fiber container in a plastic container, also a hemispheric shape and provided with a latticework or other openings therein to permit proper drainage and aeration of the tree roots.

The use of the combination cellulose fiber container and plastic retainer has a number of advantages. The cellulose fiber permits drainage of excess moisture through the fibers and through the open work of the plastic outer container. The cellulose fiber is gas- and moisture-permeable, thus permitting oxygen to reach the plant roots and harmful gases, such as carbon dioxide which is formed during photosynthesis, to be dispersed into the air. Further, upon transplantation, the plastic container may be removed and the tree, enclosed in the cellulose inner container, planted in the soil. The cellulose container will disintegrate after the passage of time and will of course, in the meantime, permit roots to grow through it and into the surrounding soil with little or no resistance.

In the drawings:

FIG. 1 is a side elevational view of one embodiment of the apparatus of the present invention showing in broken lines the cutter arm before it begins its arc of travel and further showing the cutter blade at its lowest point of travel under the tree root system;

FIG. 2 is a fragmentary plan view of the cutter arm showing the overall shape of the cut traced by the cutter arm as it travels from the start of its swing to the conclusion of the swing;

FIG. 3 is an enlarged fragmentary view of the cutter chain showing one set of teeth;

FIG. 4 is an enlarged fragmentary view of the cutting chain passing over the power sprocket;

FIG. 5 is a fragmentary perspective view of the cutting unit showing the overall shape of the unit, the pivotal mounting and the operating handle; and FIG. 6 is a perspective view of a tree with its ball of dirt after having been removed by the apparatus, together with a fiber container for the ball of dirt and a plastic openwork container within which the tree, dirt ball and cellulose container are supported.

Referring now more particularly to the drawings in which similar characters of reference refer to the same parts in each of the several views, one embodiment of the tree-digging apparatus of the present invention is shown generally at 10. This embodiment of the invention comprises a small gasoline motor 12 mounted on a suitable platform 14 which is in turn mounted on a pair of wheels 16, and with an elongate handle 18 affixed to the platform 14 in order to permit the entire apparatus to be easily moved and positioned within the nursery. A smaller unit such as illustrated may be provided with a braking arrangement for the wheels released by lever 20 for movement of the apparatus. When the lever 20 is released, the brakes are set so that once the machine is positioned for removing a tree, the unit will remain stationary.

The cutting unit comprises an arcuate flat frame 22 affixed to a hollow supporting sleeve 24. The supporting sleeve 24 surrounds the power shaft 26 which extends from the motor 12. Affixed to the mounting sleeve 24 is an operating handle 28 located 180° from the cutter frame 22. The function of the operating handle 28 will be explained below.

The cutter frame 22 is an arcuate, flat, rigid unit made up of peripheral channels 38 of high strength steel joined together by cover plates 40. At the free end 42 of the frame an idler sprocket 44 is mounted. The drive sprocket 32 is mounted inside the frame at the opposite end. The endless cutter chain 30 travels inside the channels 38 and over the sprockets 32 and 44.

The drive sprocket 32 is affixed to the drive shaft 26. The hollow supporting sleeve 24, which is preferably welded to the frame 22 surrounds the drive shaft so to that power may be supplied to the cutter chain while the frame is independently rotated by means of the handle 28.

Cutters mounted on the chain 30 and suitable for use with small trees and shrubs are illustrated in FIGS. 3 and 4. A suitable cutter blade 34 alternates with a dirt dragging blade 36. The cutter blade 34 has a sharpened leading edge 35 which may merely be hardened steel or for long life may be provided with a carbide or similar tip. The drag link 36 is designed to open up a saw kerf wide enough so that the entire supporting frame 22 may pass readily through the earth as the chain cuts the roots and scours the dirt away.

The operation of the apparatus is comparatively simple. The unit 10 is rolled into position by means of the handle 18 in front of a tree 50 to be removed from the earth. The cutter unit will rest on the ground encircling the tree as may be seen in FIG. 2. The handle 28 since it is 180° from the cutter frame 22 is located as is shown in FIG. 2. The motor 12 is started so that the chain is now driven around the cutter frame 22. As soon as pressure is applied to the handle 28, the cutter blades commence cutting into the earth and as pressure is continued to be applied to the handle 28 by rotating the sleeve support 24 by means of the handle, the cutter frame and cutting chain continues to cut into the earth passing around and under the tree and the major portion of its root structure 52 until the cutter unit breaks through the surface of the earth on the opposite side from which it started. Thus the cutter has passed completely under the tree and it is a comparatively simple matter to lift the tree 50 with its ball of earth 44 as may be seen in FIG. 6 from the earth. Because the cutter frame 22 is mounted on the power shaft 26 and has a free end 42, the tree 50 with its ball of earth 44 need not be lifted from the earth immediately to free the cutter. Since there is no framework around the cutter, the entire apparatus may be moved to the next tree leaving the previously cut trees with their root and earth balls to be lifted by other crews. This will result in a substantially faster and more efficient operation since the cutting crew need not await the lifting of the tree to remove the cutter apparatus, but rather may pass the cutter around and because of its open end move the equipment to the next tree and repeat the operation for as many trees as are required.

The tree 50 with its ball of earth 54 is then placed in a saucer-shaped fibrous container 56 having the same saucer shape as the ball 54. This fibrous container may be asphalt impregnated in order to retain substantially more wet strength than is available from the ordinary composite fibrous material. The tree in its fibrous container is then placed in a latticework plastic container 58 having the same shape as the fiber container and the earth ball.

The fibrous container should be made from non-woven fibers which will distintegrate after a prolonged period in the ground. Any of the plant materials commonly used are satisfactory. For example, cellulose fibers such as wood chips, waste paper pulp and the like may be used. The objective is for the container to become composted after the tree and fiber container are transplanted.

This openwork plastic container is water insoluble and thus will not distintegrate as does the conventional wooden or metal container or burlap wrapping conventionally used for such work. The latticework container has the further advantage of being perforate so that excess water cannot accumulate within the earth during storage of the tree prior to transplantation.

Thus it may be seen that the use of the apparatus described above together with a properly shaped impregnated cellulose fiber container and a permeable plastic outer container results in speedy and efficient removal of trees from the ground with a minimum of damage to the root system, and rapid and efficient containerization of the dirt ball surrounding the removed tree or shrub. Upon transplantation, the plastic container is removed and may be discarded and the tree with its surrounding dirt contained within the cellulose fiber container may be planted directly in the place of transplantation. The cellulose fiber outer container will disintegrate within the earth after a comparatively short period of time. During the period of its disintegration, it will offer little or no resistance to roots growing through it and into the surrounding earth so that the tree will survive the transplantation in perfect condition, and grow and flourish in its new environment.

Although one embodiment of this invention has been shown utilizing a small portable power supply, it will be understood by those skilled in the art that a similar cutter arrangement may be mounted on a considerably larger machine such as a tractor or similar self-propelled vehicle. The cutter unit may of course be smaller or larger depending upon the use to which it may be put. Further, it will be understood by those skilled in the art that the means for rotating the cutter unit passing it around and under the tree need not be a handle with the power supplied by the human operator but may be done mechanically by use of a supplemental drive unit from a prime mover.

It will thus be appreciated that although one embodiment of my invention has been shown and described, other adaptations and modifications will be obvious to those skilled in the art without departing from the true spirit and scope of the invention as limited only by the appended claims.

I claim:

1. Apparatus for digging trees from the ground for transplantation comprising: a rigid substantially arcuate cutter frame having a first end and a second end, the second end diametrally opposite the first end, said frame mounted only at said first end for rotation about the diametral axis; a flexible cutter mounted on the frame, said cutter provided with means for scraping dirt and cutting tree roots; means for driving the flexible cutter; and means to pivot the cutter frame about said first end so that the frame penetrates the ground surface on one side of a tree, passes under the tree and exits at the ground surface on the other side of the tree said second end being supported only by the cutter frame so that the apparatus may be moved from the vicinity of the tree without removing the tree from the ground or returning the frame under the tree to the first side of the tree.

2. The apparatus of claim 1 wherein said cutter comprises a continuous roller chain adapted for side-wise flexing and which passes around the edge of the cutter frame and wherein the means for scraping dirt and cutting roots are cutter teeth affixed to the roller chain; and wherein the cutter frame is provided with sleeve means through which a cutter chain drive shaft passes, said drive shaft supporting the cutter frame which is pivotable on the shaft during rotation of the shaft.

3. The apparatus of claim 1 wherein the means for driving the cutter comprises a prime mover mounted on a supporting vehicle, said vehicle provided with means permitting movement along the ground, and including means for holding the vehicle stationary when the vehicle is positioned adjacent a tree to be removed from the ground.

References Cited

UNITED STATES PATENTS

| | | | |
|---|---|---|---|
| 1,507,460 | 9/1924 | Carroll | 37—2 |
| 1,607,784 | 11/1926 | Spangler | 37—2 |
| 2,410,203 | 10/1946 | Culley | 37—2 |
| 2,630,308 | 3/1953 | Moon | 37—2 |
| 2,648,358 | 8/1953 | Lower | 37—2 X |
| 2,755,570 | 7/1956 | Blackburn et al. | 37—2 |
| 2,815,048 | 12/1957 | Davis | 37—2 X |
| 3,028,691 | 4/1962 | Jeffres | 37—2 |

ROBERT E. PULFREY, Primary Examiner

E. H. EICKHOLT, Assistant Examiner

U.S. Cl. X.R.

299—36